US007493185B2

(12) United States Patent
Cheng et al.

(10) Patent No.: US 7,493,185 B2
(45) Date of Patent: Feb. 17, 2009

(54) QUALITY PROGNOSTICS SYSTEM AND METHOD FOR MANUFACTURING PROCESSES

(75) Inventors: Fan-Tien Cheng, Tainan (TW);
Yu-Chuan Su, Hsin Ying (TW);
Guo-Wei Huang, San Chung (TW);
Min-Hsiung Hung, Ta Hsi Town (TW)

(73) Assignee: National Cheng Kung University, Tainan (TW)

( * ) Notice: Subject to any disclaimer, the term of this patent is extended or adjusted under 35 U.S.C. 154(b) by 614 days.

(21) Appl. No.: 11/142,316

(22) Filed: Jun. 2, 2005

(65) Prior Publication Data
US 2005/0288812 A1 Dec. 29, 2005

(30) Foreign Application Priority Data
Jun. 3, 2004 (TW) .............................. 93115993 A

(51) Int. Cl.
*G06F 19/00* (2006.01)
(52) U.S. Cl. .......................... 700/108; 700/28; 700/30; 700/47; 700/48; 700/50; 700/51; 700/52; 700/103; 702/81; 706/1; 706/15
(58) Field of Classification Search .................. 700/28, 700/30, 31, 33, 48–52, 103–105, 108, 109, 700/121; 702/81–84; 706/1, 2, 15, 62
See application file for complete search history.

(56) References Cited

U.S. PATENT DOCUMENTS

| 5,408,405 | A | * | 4/1995 | Mozumder et al. ............ 700/31 |
| 6,594,542 | B1 | | 7/2003 | Williams |
| 6,616,759 | B2 | | 9/2003 | Tanaka et al. |
| 6,622,059 | B1 | * | 9/2003 | Toprac et al. ................ 700/121 |
| 6,625,513 | B1 | | 9/2003 | Lymberopoulos et al. |
| 6,666,577 | B2 | | 12/2003 | Shibata et al. |
| 2005/0071039 | A1 | * | 3/2005 | Mitrovic ...................... 700/121 |

FOREIGN PATENT DOCUMENTS

JP 05253797 A 10/1993

* cited by examiner

*Primary Examiner*—Sean P Shechtman

(57) ABSTRACT

A quality prognostics system and a quality prognostics method for predicting the product quality during manufacturing processes are disclosed, wherein the current production tool parameters sensed during the manufacturing process and several previous quality data collected from the measurement tool are utilized to predict the future product quality, and a conjecture modeling step and prediction modeling step are performed respectively. The conjecture modeling step itself also can be applied for the purpose of virtual metrology. Further, a self-searching step and a self-adjusting step are performed for searching the best combination of various parameters/functions used by the conjecture algorithm or prediction algorithm; and meeting the requirements of new equipment parameters and conjecture/prediction accuracy.

19 Claims, 10 Drawing Sheets

| sample time | vacuum | gas concentration 1 | gas concentration 2 | gas concentration 3 | power | move-in time | product measurement data |
|---|---|---|---|---|---|---|---|
| hh:mm:ss | micro bar | cubic cm/min | cubic cm/min | cubic cm/min | kW | yy/mm/dd mm:ss | nm*100 |
| 12:13:02 | 1.50E-04 | 0.7 | 0.5 | -2.2 | 5.1 | 2003/5/1 12:13 | 6.85 |
| 12:13:12 | 1.20E-04 | 0.7 | 0.3 | -1.7 | 6 | | |
| 12:13:22 | 2.60E-03 | 67.5 | 0.1 | 208.8 | 7.5 | | |
| 12:13:32 | 7.80E-05 | 1.7 | 0.5 | -1.7 | 1.3 | | |
| 12:13:42 | 3.70E-04 | 0.9 | 0.5 | -1.7 | 1.7 | | |
| 12:13:52 | 1.70E-04 | 0.9 | 0.5 | -1.7 | 10.9 | | |
| 12:14:02 | 1.40E-04 | 0.9 | 0.5 | -1.7 | 5.1 | 2003/5/1 12:14 | 6.78 |
| 12:14:12 | 1.10E-04 | 0.9 | 0.5 | -1.7 | 6.1 | | |
| 12:14:22 | 2.60E-03 | 67.5 | 0.9 | 208.8 | 7.6 | | |
| 12:14:32 | 3.80E-05 | 1.3 | 0.5 | -1.7 | 0 | | |
| 12:14:42 | 2.40E-04 | 0.9 | 1.3 | -1.7 | 3.3 | | |
| 12:14:52 | 1.80E-04 | 0.9 | 0.5 | -1.7 | 1.7 | | |

Fig. 6

QUALITY PROGNOSTICS SYSTEM AND METHOD FOR MANUFACTURING PROCESSES

RELATED APPLICATIONS

The present application is based on, and claims priority from, Taiwan Application Serial Number 93115993, filed Jun. 3, 2004, the disclosure of which is hereby incorporated by reference herein in its entirety.

FIELD OF THE INVENTION

The present invention relates to a quality prognostics system and a quality prognostics method for manufacturing processes, and more particularly, to the quality prognostics system and method suitable for use in virtual metrology and predicting product quality manufactured on production tools in semiconductor or TFT-LCD manufacturing plants.

BACKGROUND OF THE INVENTION

Production and quality measurement are generally separated in semiconductor and TFT-LCD plants, i.e. after first being processed on a production tool, products are then delivered to a measurement tool for inspection. Based on cost consideration, most of the inspection jobs are done by randomly selecting some products in a product lot to determine the product quality. Consequently, occurrence of defects during production process may not usually be discovered until measurement. As such, numerous defective products might have been produced before measurement is performed. Currently, most methods to overcome this problem are to monitor process parameters of the production tool so as to judge whether any product quality defects occur. Those methods are commonly disadvantageous in that defective products have already been produced as soon as the monitoring system detects that the process parameters are abnormal. Currently, most semiconductor and TFT-LCD plants employ batch production, meaning that in the event of defects being discovered, the entire product lot must be discarded, not simply one or two units of products. Therefore, defects not only reduce product yield, but also seriously impact production capacity and cost. Every manufacturer consequently, is eager to find a way to predict production quality of the next product lot.

Currently, several scholars have performed some researches on how to predict product quality or whether the equipment or process is abnormal. Those researches includes: proposing an architecture for improving equipment maintenance work in semiconductor plants and identifying the cause of a defect based on the production data; applying neural networks for real-time fault identification in plasma etching, wherein a pattern recognition technique is used to determine the process number for each record of plasma etching; designing a neurofuzzy system having a graphic user interface for surface mount assembly defect prediction and control by using fuzzy associative memory (FAM) to gather process knowledge in combination with operation management strategy of level coordination, wherein the surface mounting technique (SMT) is used as an example; providing a methodology for extracting wafer-level defect density distributions to improve yield prediction, so as to find the degree of defect wafer clustering, thereby saving the time and cost for data collection and analysis; proposing an approach for reliable life-time prediction of GaAs devices via quantitative measurement of channel temperature; and studying the influence of elevated temperature on degradation and lifetime prediction of thin silicon-dioxide films.

However, the above studies mainly focus on using the available sensor data to identify possible defects of current production, but not the quality of the next product lot. Generally speaking, not many input data can be considered simultaneously for purposes of conjecture in most studies, and the applications of the proposed conjecture schemes are limited to certain types of equipment.

With regard to the existing patent references, U.S. Pat. No. 6,594,542, applied in the semiconductor industry, discloses a system for controlling chemical mechanical polishing thickness removal, the system mainly comprising three parts: a polisher, a thickness measuring device and a polishing rate control system. Based on film thickness comparison, the patent reference predicts the required polishing rate. This patent reference basically still needs to use actual quality measurement values for providing the information required by polishing control. This patent reference cannot conjecture the film thickness by the method of virtual metrology, and the film thickness cannot be determined until measurement.

U.S. Pat. No. 6,625,513, applied in the semiconductor equipment industry, discloses a method of using data-based model to compare the semiconductor tool variations during production processes, and to change the parameter settings in accordance with the comparison result, thereby preventing the defective products produced from tool variations. This method is disadvantageous in that: varieties and difficulty level of the data-based model relatively increase a lot, when there are many process parameters; and the data-based model cannot be properly used in accordance with various tool features, thus not having flexibility.

U.S. Pat. No. 6,616,759, applied in a semiconductor process, discloses a method and a system for monitoring a semiconductor processing apparatus and predicting its processing results. This method collects sensor data of the semiconductor processing apparatus and the measurement values of the process result, and uses a partial least square method to calculate new parameter settings. However, this method is merely based on the existing parameter data to predict the measurement value of the product currently being manufactured, but cannot further predict the quality of the product to be produced in a future period of time.

U.S. Pat. No. 6,666,577, applied in wafer temperature prediction, discloses a method for predicting wafer temperature. This method uses two different coating films formed on the wafer to predict the wafer temperature. However, the method disclosed in this patent reference basically can be merely applicable to certain types of equipment, and lacks of generic applicability.

Hence, there is an urgent need to develop a quality prognostics system and a quality prognostics method for manufacturing processes, thereby predicting the quality of a next product lot before the next product lot is produced by using the current process parameters of a production tool and the actual measurement values of several previous product lots produced in the measurement tool; and having generic applicability, thus further reducing the shortcomings of the conventional skills.

SUMMARY OF THE INVENTION

A main aspect of the present invention is to provide a quality prognostics system and a quality prognostics method for manufacturing processes, thereby predicting the quality of a next product lot before the next product lot is produced by using the current process parameters of a production tool and the actual measurement values of several previous product lots produced in the measurement tool, thus effectively promoting product quality, and equipment efficiency and availability, further promoting competitiveness for manufacturing industries.

The other aspect of the present invention is to provide a quality prognostics system and a quality prognostics method for manufacturing processes, thereby having generic applicability for use in various tools in semiconductor and TFT-LCD processes.

According to the aforementioned aspects, a quality prognostics system for manufacturing processes is provided.

According to a preferred embodiment of the present invention, the quality prognostics system for manufacturing processes is mainly composed of conjecture modeling means and prediction modeling means. The conjecture modeling means uses a set of input data of a production tool to conjecture a conjecture value for a product lot currently manufactured in the production tool, wherein the conjecture modeling means is built in accordance with a conjecture method, and the conjecture method is selected from the group consisting of a first neural network technique, a fuzzy logic technique, a stepwise regression technique and other technologies having the conjecturing capability. The prediction modeling means uses the conjecture value of the product lot currently conjectured together with at least one actual measurement value of at least one previous product lot to predict a prediction value for a next product lot, wherein the prediction modeling means is built in accordance with a prediction method, and the prediction method is selected from the group consisting of a weighted moving average technique, a second neural network technique and other algorithms having the prediction capability. Further, the quality prognostics system comprises raw-data pre-processing means for converting a set of raw data inputted from the production tool to the set of input data of a specific format. Further, the quality prognostics system comprises self-searching means for finding an optimal combination of parameters/functions required by the conjecture method or the prediction method when the conjecture method or the prediction method is just selected and related initial values are just set up, thereby increasing the prediction/conjecture accuracy. Further, the quality prognostics system comprises self-adjusting means for tuning system parameters to meet the prediction/conjecture accuracy requirement, when a prediction accuracy or a conjecture accuracy is lowered than a predetermined lower bound or the properties of the production tool are changed due to scheduled maintenance or part replacement, after the production tool has been operated for a period of time.

Besides, according to the aforementioned aspects, a quality prognostics method for manufacturing processes is provided.

According to the preferred embodiment of the present invention, the quality prognostics method for manufacturing processes comprises: providing a conjecture modeling step and a prediction modeling step. The conjecture modeling step uses a set of input data of a production tool to conjecture a conjecture value for a product lot currently manufactured in the production tool, wherein the conjecture modeling step is based on a conjecture method, and the conjecture method is selected from the group consisting of a first neural network technique, a fuzzy logic technique, a stepwise regression technique and other technologies having the conjecturing capability. The conjecture modeling step can also be used for virtual metrology, which is defined as a method to conjecture operation performance of a production tool based on data sensed from the production tool and without metrology operation. The prediction modeling step uses the conjecture value of the product lot together with at least one actual measurement value of at least one previous product lot to predict a prediction value for a next product lot, wherein the prediction modeling step is based on a prediction method, and the prediction method is selected from the group consisting of a weighted moving average technique, a second neural network technique and other algorithms having the prediction capability. Further, the quality prognostics method comprises: performing a raw-data pre-processing step for converting a set of raw data inputted from the said production tool to the set of input data of a specific format. Further, the quality prognostics method comprises: performing a self-searching step for finding an optimal combination of parameters/functions required by the conjecture method or the prediction method when the conjecture method or the prediction method is just selected and related initial values are just set up, thereby increasing the prediction/conjecture accuracy. Further, the quality prognostics method comprises: performing a self-adjusting step for tuning system parameters to meet the prediction/conjecture accuracy requirement of the production tool newly changed, when a prediction accuracy or a conjecture accuracy is lowered than a predetermined accuracy bound or the properties of the production tool are changed due to scheduled maintenance or part replacement, after the production tool has been operated for a period of time.

Hence, with the application of the present invention, the quality of a next product lot can be prognosed before being produced by using the current process parameters of a production tool and the actual measurement values of several previous product lots produced in the measurement tool; and the present invention also has generic applicability, thus reducing the shortcomings of the conventional skills.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 6 is a table showing the samples of sensor data and product measurement data according to the illustrative example of the present invention;

DETAILED DESCRIPTION OF THE PREFERRED EMBODIMENT

The present invention can predict the production quality of the next product lot based on the current product lot sensor data of the production tool and the quality measurement data from the measurement tool for several previous product lots. The so-called next product lot means the product lot to be produced in the next production cycle, and the previous product lot means the product lot which has been produced in the previous production cycle.

Figure 1:
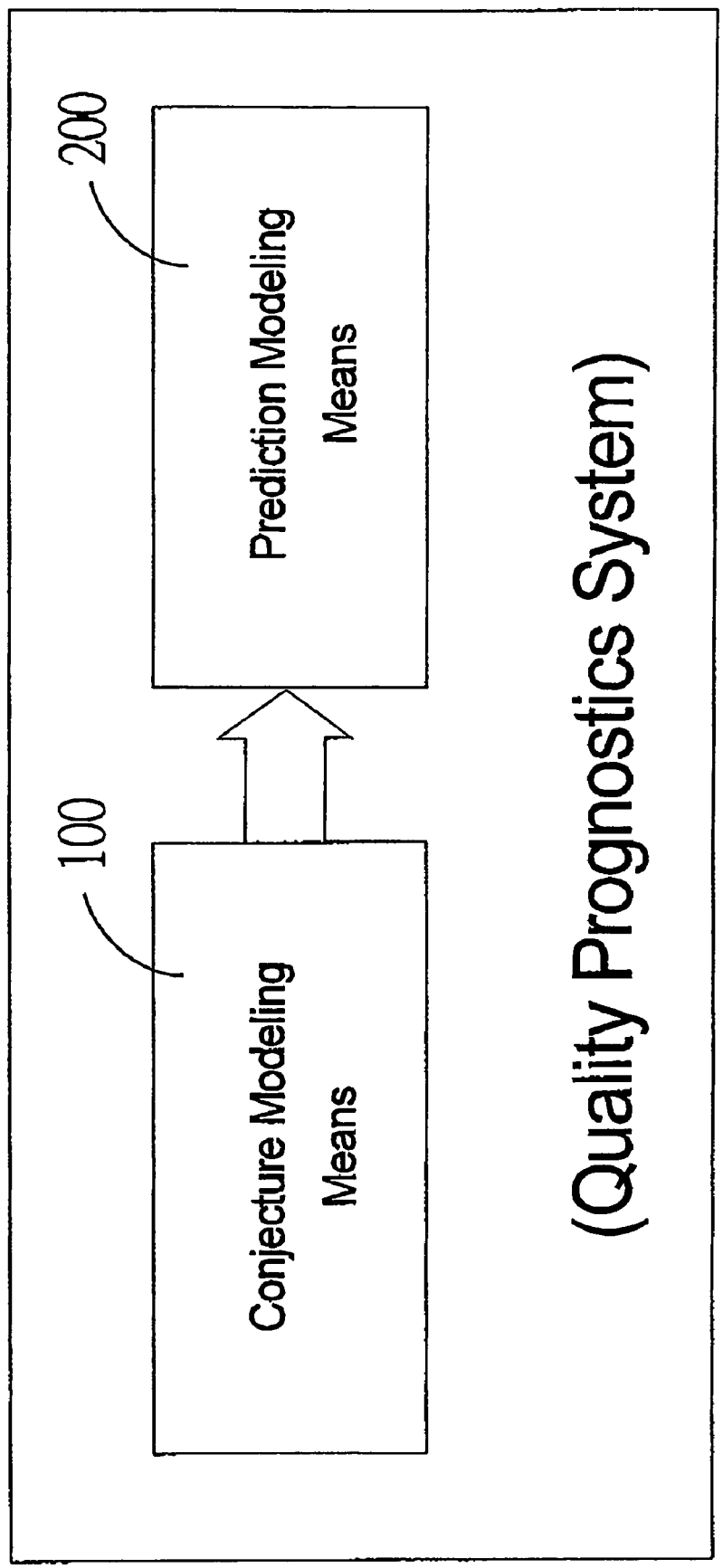
FIG. 1 is a schematic diagram showing the main structure of a quality prognostics system for manufacturing processes according to a preferred embodiment of the present invention.

Referring to FIG. 1, FIG. 1 is a schematic diagram showing the main structure of a quality prognostics system for manufacturing processes according to a preferred embodiment of the present invention, wherein the quality prognostics system is composed of conjecture modeling means 100 and prediction modeling means 200, and can be used for both virtual metrology and quality prediction, wherein the conjecture modeling means 100 can be applied to virtual metrology. Using this two-tier arrangement, the quality prognostics system can be formed in an appropriate combination according to the actual needs of the plant, and is more flexible on practical applications. Further, a conjecture method used in the conjecture modeling means 100 for establishing a conjecture model is replaceable, and various algorithms of artificial intelligence, statistics or mathematics, such as neural networks, fuzzy logic, stepwise regression techniques, etc., all can be selected as the conjecture method. As to a prediction method used in the prediction modeling means 200 for establishing a prediction model, weighted moving average, neural networks, or any algorithm with prediction capability can be used as the prediction method.

Figure 2:
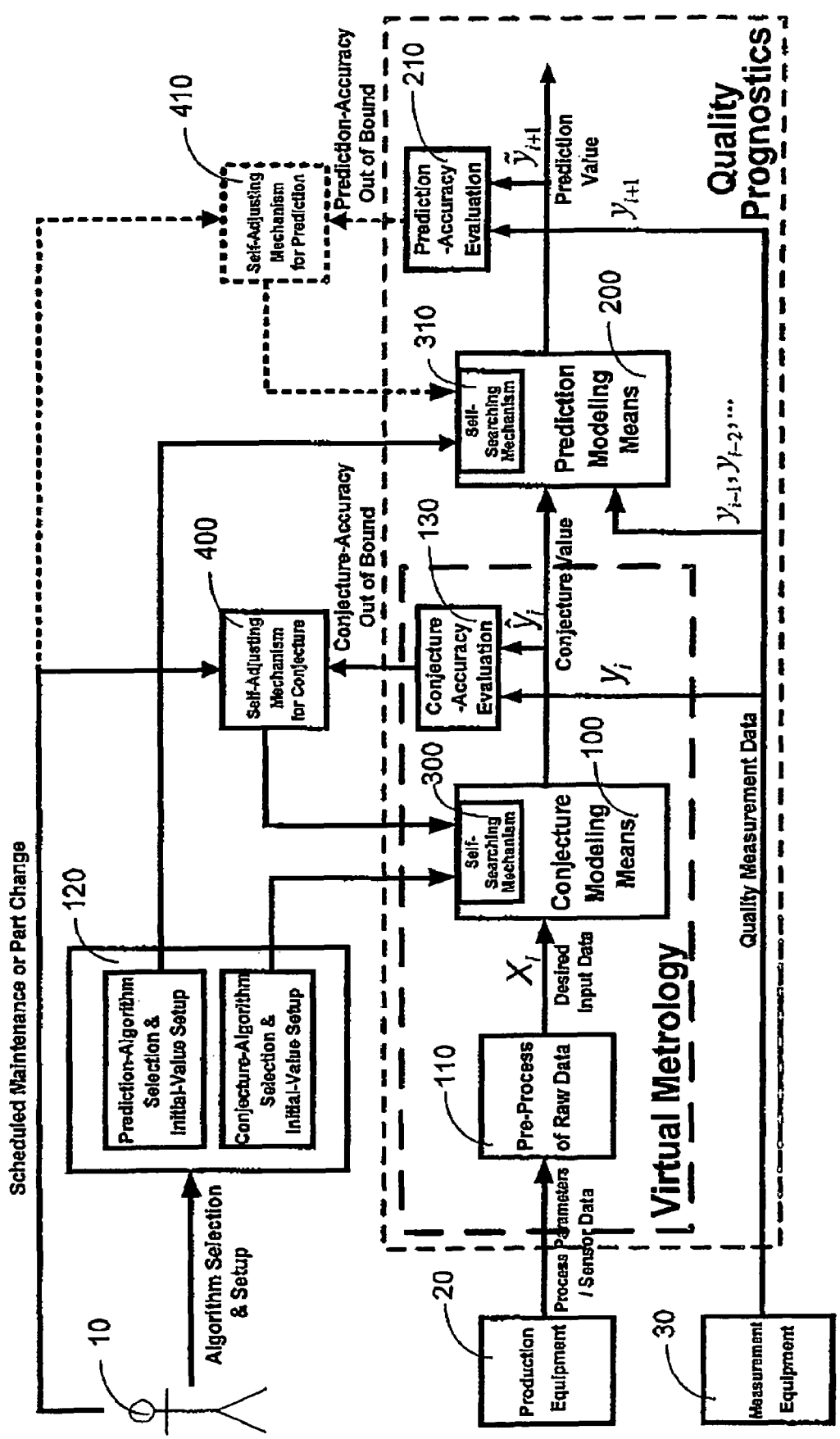
FIG. 2 is a schematic diagram showing the structure of the quality prognostics system having self-searching means and self-adjusting means according to the preferred embodiment of the present invention.

Referring to FIG. 2, FIG. 2 is a schematic diagram showing the structure of the quality prognostics system having self-searching means and self-adjusting means according to the preferred embodiment of the present invention. At first, process parameters and sensor data of a production tool 20 are delivered to raw-data pre-processing means 110 for treatment. Because many types of process parameters and sensor data of the production tool 20 are collected, and perhaps only a portion of the process parameters and sensor data collected is required in the conjecture modeling means 100, raw-data pre-processing means 110 is needed to perform data selection, whereby desired input data ($X_i$) are extracted from the numerous process parameters and sensor data. Generally, the guidelines of data selection depend on the relationships between the parameters and the product, as well as the properties of the conjecture method or the prediction method. Moreover, the process parameters and sensor data acquired from the production tool 20 may be different in data format, so that raw-data pre-processing means 110 must have the capability of handling these data of different formats to transform the data to the specific input formats required by the conjecture modeling means 100.

Thereafter, the desired input data treated by the raw-data pre-processing means 110 is sent to the conjecture modeling means 100. The conjecture modeling means 100 is designed to conjecture the current product quality by using the desired input data ($X_i$) collected from the raw-data pre-processing means 110, so as to obtain a conjecture value ($\hat{y}_i$). The conjecture value is inputted to the prediction modeling means 200. The prediction modeling means 200 is designed to predict the quality of the next product lot by using the conjecture value ($\hat{y}_i$) of the current product lot and the actual measurement values ($y_{i-1}, y_{i-2}, \ldots, y_{i-n}$) of several previous product lots obtained from a measurement tool 30, so as to obtain a prediction value ($\tilde{y}_{i+1}$). Similar to the conjecture modeling means 100, various algorithms with prediction capability can be selected as the prediction method in accordance with the properties of the production tool 20, such as weighted moving average and neural networks, etc.

Thereafter, the conjecture value ($\hat{y}_i$) is sent to means 130 for evaluating the conjecture accuracy, wherein the conjecture value ($\hat{y}_i$) is compared with the actual measurement value ($y_i$) of the current product lot so as to obtain a conjecture evaluation index representing the conjecture accuracy. Meanwhile, the prediction value ($\tilde{y}_{i+1}$) is sent to means 210 for evaluating the prediction accuracy, wherein the prediction value ($\tilde{y}_{i+1}$) is compared with the actual measurement value ($y_{i+1}$) of the next product lot so as to obtain a prediction evaluation index representing the prediction accuracy. There are several methods for evaluating the conjecture/prediction accuracy, and an appropriate evaluation index can be selected as the conjecture/prediction evaluation indexes of the present invention in accordance with the properties of the target to be evaluated, such as mean absolute percentage error (MAPE) and a maximum error.

Further, because diverse types of production tool in semiconductor and TFT-LCD plants possess different properties, it is very unlikely that a single conjecture algorithm will be able to be applied to all types of equipment. To solve this problem, the present invention provides a generic (universal) conjecture modeling means 100 and a generic prediction modeling means 200, wherein a user 10 may use a selection-and-setup interface 120 to properly select the conjecture method and the prediction method from various algorithms of artificial intelligence, statistics and mathematics. With increase of the types of production tool, the conjecture/prediction algorithms also increase accordingly. While there are more and more conjecture/prediction algorithms, the adaptability of the present invention will be larger. The purpose of the selection-and-setup interface 120 is to assist the user 10 to select the conjecture method and the prediction method properly, and setting up related initial values. After the user 10 has completed the conjecture/prediction algorithm selections and initial-value setups, the quality prognostics system can commence running.

Further, the present invention is also featured in providing self-searching means (mechanism) 300 of the conjecture model; self-searching means (mechanism) 310 of the prediction model; self-adjusting means (mechanism) 400 of the conjecture model; and self-adjusting means (mechanism) 410 of the prediction model, thereby reducing time and effort for building the conjecture/prediction models. Such as shown in FIG. 2, for efficiently constructing an acceptable conjecture or prediction model, the present invention provides the self-searching means with various built-in algorithms. For example, if a back-propagation neural-network algorithm is selected as the conjecture method for establishing the conjecture model, the self-searching means 300 will base on the associated number of hidden layers, the associated number of nodes for each hidden layer, and transfer functions to automatically find an optimal combination of parameters/functions required by the conjecture method, wherein the associated number of hidden layers, the associated number of nodes for each hidden layer, and transfer functions are initially assigned by the user 10. If a fuzzy theory is selected as the conjecture method for establishing the conjecture model, then the self-searching means 300 will base on the possible membership functions defined to find optimal membership functions. Besides, a radials-basic-function neural network may also be selected for shortening training time of the conjecture model. Similarly, if a weighted-moving-average algorithm is chosen for establishing the prediction model, then the self-searching means 400 will base on the associated range of weight values defined by the user 10 to find the optimal combination of weight values. Hence, the user 10 simply needs to initially specify the bounds or possibilities of the assigned parameters/functions, and the self-searching means 300 and 310 then will search for the best combination of model parameters, functions and weight values automatically. Generally, with regard to different types of production tool, their process parameters and sensor data are also different, and thus the conjecture model and the prediction model have to be established in accordance with the properties of the production tool. Moreover, to build a new model-usually needs to invest a lot of manpower and time, so that the purpose of the self-searching means is to shorten the development time and reduce manpower required by means of individual pre-established models, thereby greatly shortening the time of setup and adjustment while the conjecture/prediction system is migrated to a new production tool.

On the other hand, during a production process, the production tool may suffer from part aging or fading over time, thus causing equipment-property offset. Scheduled maintenance or part change might bring about equipment-property inconsistency when the equipment restarts. Therefore, the quality prognostics system should possess the capability of self-adjusting, and self-adjusting means 400 of the conjecture model and self-adjusting means 410 of the prediction model are used for solving the above-mentioned problems. By monitoring the evaluation indexes of conjecture/prediction accuracy, the self-adjusting means 400/410 can be aware of the real-time conditions of the conjecture/prediction modeling means 100/200 promptly, and a predetermined lower bound M % (such as from 90% to 99%) for tolerable accuracy can be defined in accordance with the actual requirement of production tool. When the conjecture accuracy or the prediction accuracy is lower than the predetermined lower bound M %, the self-adjusting means 400/410 will be launched and cooperate with the self-searching means 300/310 to add the data of which the conjecture accuracy or the prediction accuracy is lower than the predetermined lower bound to training data sets, thereby re-training and rebuilding a new conjecture/prediction model to replace the old conjecture/prediction model, so that the conjecture/prediction accuracy can return back to the original acceptable bond.

The self-adjusting means 410 (mechanism) for the prediction model illustrated in FIG. 2 is marked by dotted lines. The dotted lines indicate that this self-adjusting mechanism is optional. The existence of the self-adjusting means 410 depends on the feature of the prediction algorithm selected by the user 10. For example, if neural networks are adopted in the prediction modeling means 200, then the addition of the self-adjusting means is essential for lowering prediction errors and making the prediction result more accurate. However, if the weighted moving average is used in the prediction modeling means 200, then the addition of the self-adjusting means 410 is not necessary. Further, the range of setting the parameters/functions for the new models can be based on those used for the old models, whereby the new model can search the parameters/functions in a smaller range, thus saving the searching time for the self-adjusting means.

Hereinafter, a sputtering tool from a TFT-LCD factory is used as an illustrative example for explaining the present invention.

Figure 3:
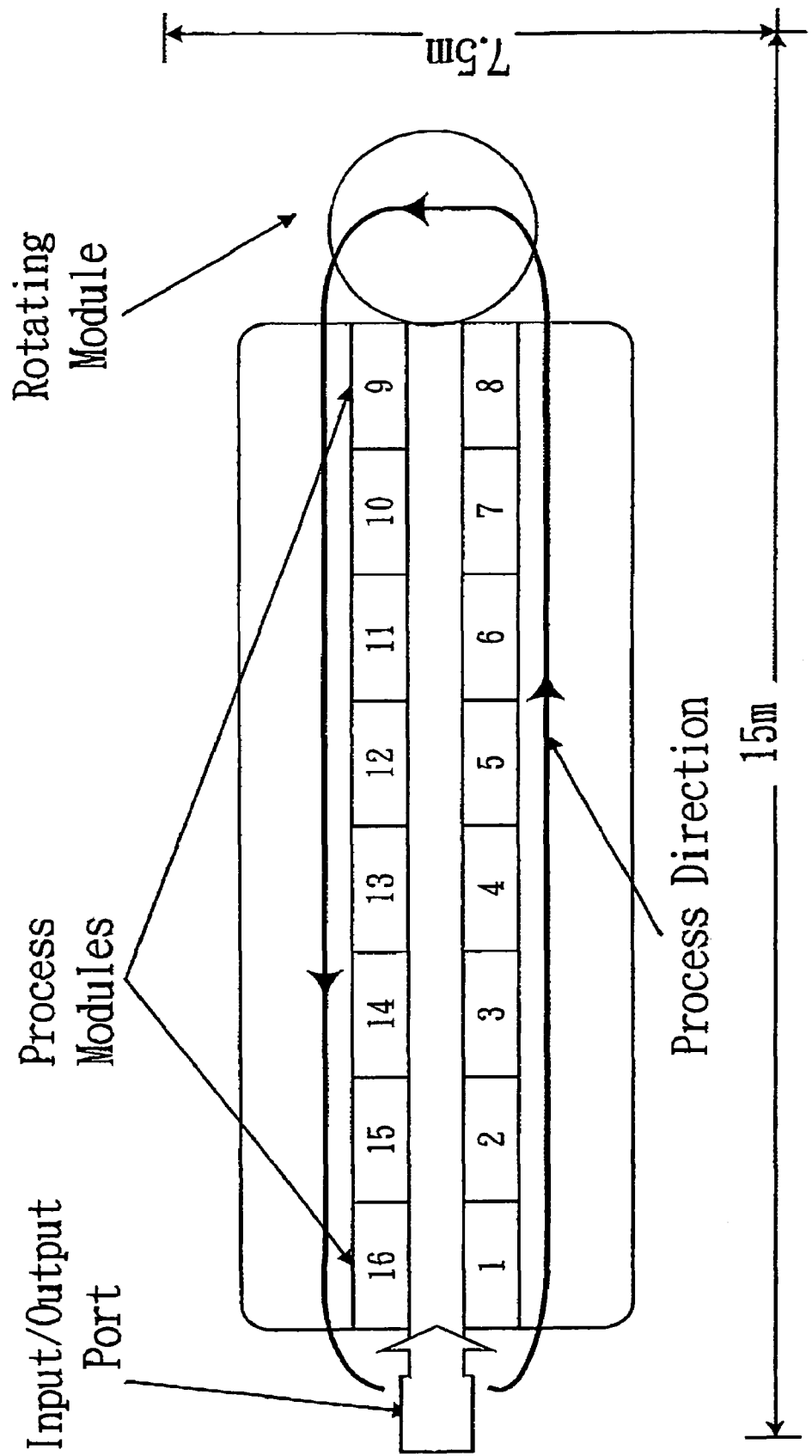
FIG. 3 is a schematic diagram showing a sputtering tool of TFT-LCD factory according to an illustrative example of the present invention.

Referring to FIG. 3, FIG. 3 is a schematic diagram showing a sputtering tool of TFT-LCD factory according to an illustrative example of the present invention. The sputtering equipment includes 16 process modules each of which is assigned to a different process, and the objective thereof is to plate a thin metallic coating on glass (raw material), and the thin metallic coating serves as a color frame for LCD panels. The arrow direction in FIG. 3 indicates the process sequence. At first, glass enters the process modules via an input/output port, and is processed in compliance with the module numbers. Upon passing process modules 1~8, the glass is sent by a rotating module to process module 9 for the subsequent processing. Finally, the glass leaves the sputtering tool via the input/output port. Each module is in the vacuum condition during the entire process. A vacuum sensor is installed on a vacuuming module for collecting a vacuum condition. Moreover, a gas concentration sensor is installed on an inert gas delivering module to monitor an actual gas-concentration condition. Sensors for detecting voltages, electric currents and powers are installed in the electric field which controls the ion plasma concentration. Consequently, numerous sensor data are recorded during the manufacturing process, i.e. the production tool will record the process parameters (sensor) data during the entire manufacturing process. After the manufacturing process is done, two out of 100 sheets of products are randomly selected and sent to a measurement tool for measuring and recording their sputtering coating thickness.

Figure 4:
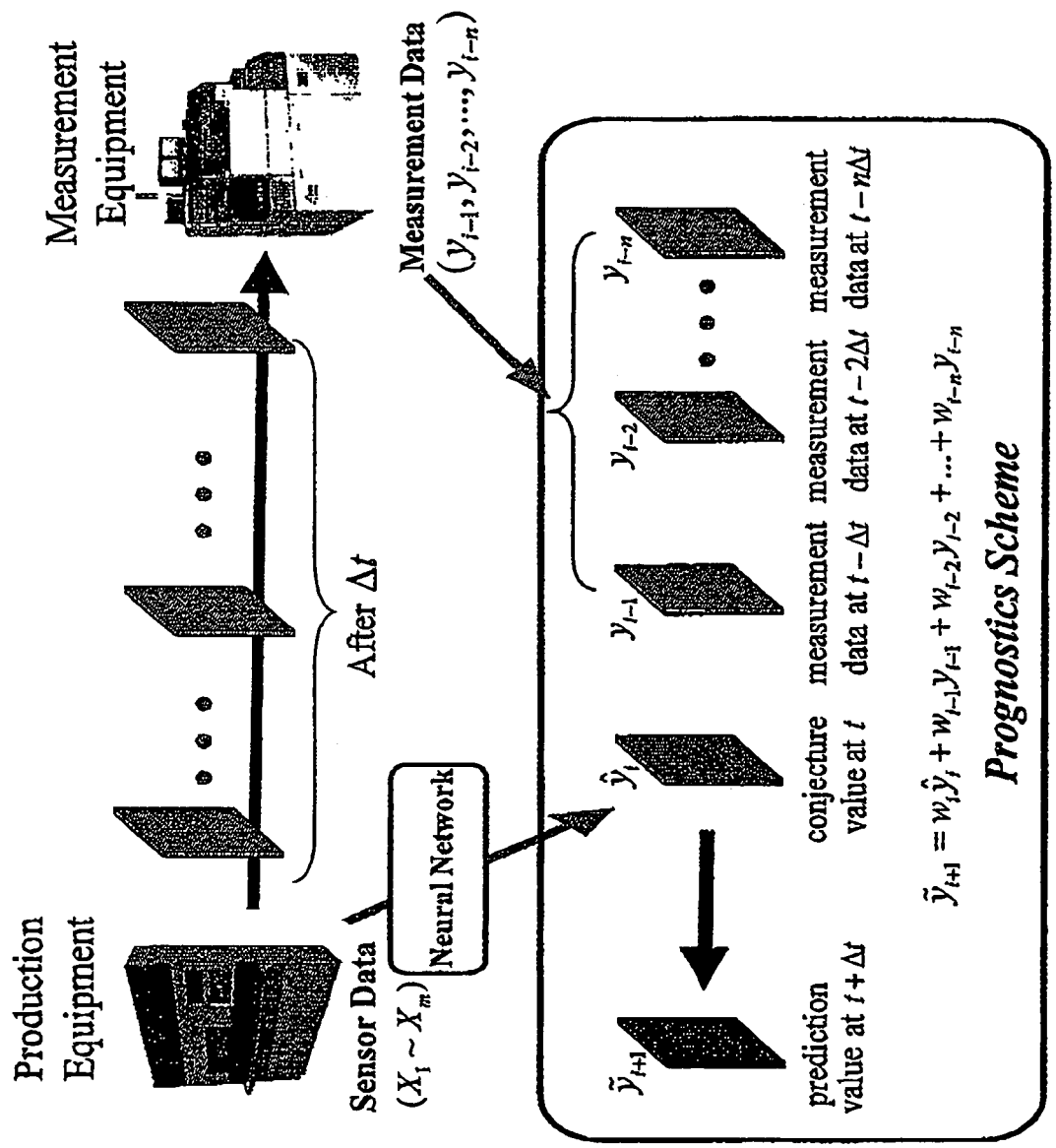
FIG. 4 is a schematic diagram showing the deployment flow of the illustrative example of the present invention.

Referring to FIG. 4, FIG. 4 is a schematic diagram showing the deployment flow of the illustrative example of the present invention. By considering the actual measurement values ($y_{i-1}$, $y_{i-2}$, . . . , $y_{i-n}$) of several previous product lots from the measurement tool, together with the conjecture value ($\hat{y}_i$) of the current product lot conceived from sensor data of the production tool, the next-lot prediction value of the sputtering coating thickness ($\hat{y}_{i+1}$) can be prognosed.

(1) Construction of the Conjecture Model

Figure 5:
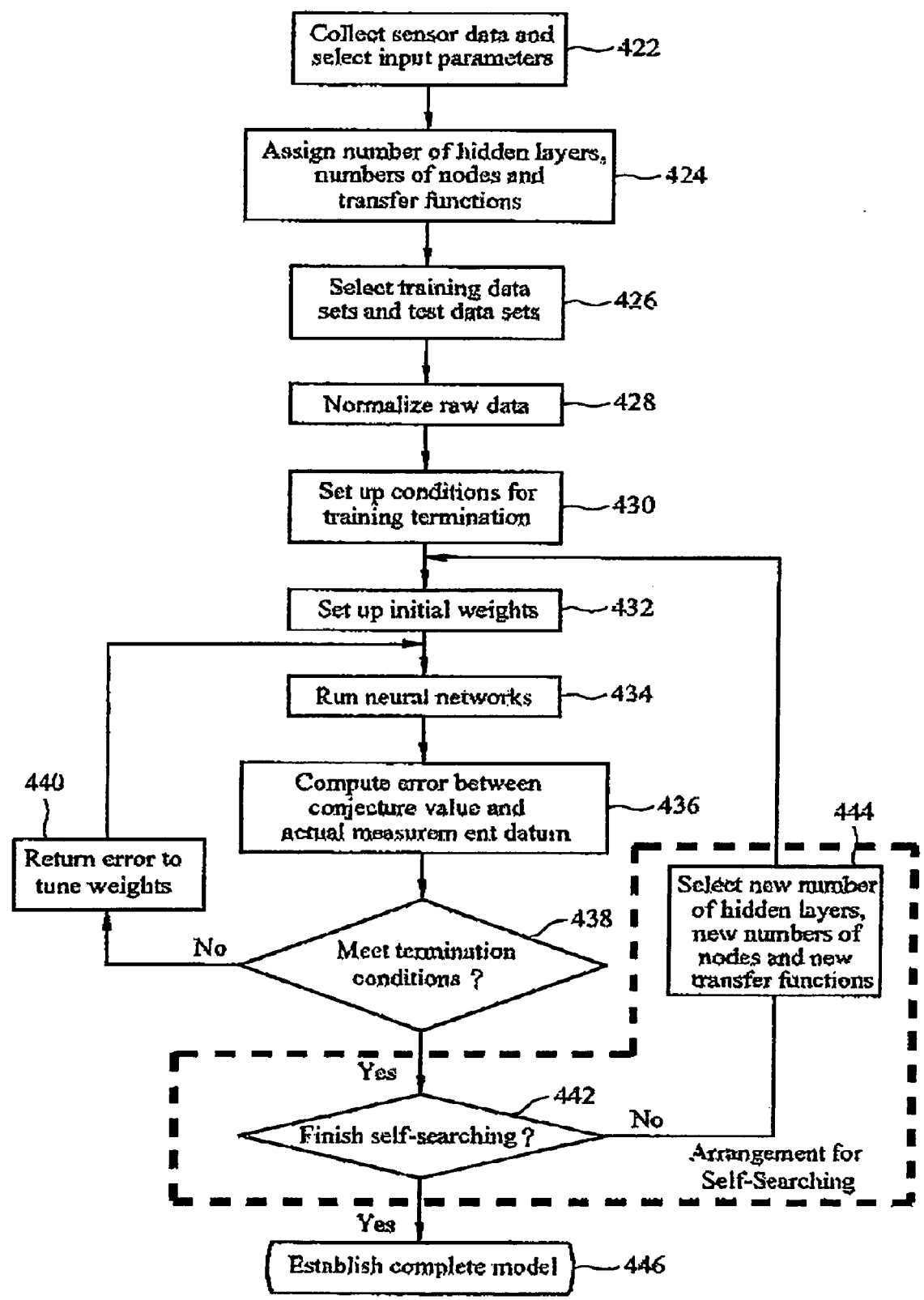
FIG. 5 is a schematic flow chart showing the steps for constructing a conjecture model according to the preferred embodiment of the present invention.

Numerous algorithms of artificial intelligence, mathematics and statistics may be applied to construct a conjecture model. In the present illustrative example, back-propagation neural networks are applied to establish the conjecture model. Referring to FIG. 5, FIG. 5 is a schematic flow chart showing the steps for constructing a conjecture model according to the preferred embodiment of the present invention.

At first, step 422 is performed to collect sensor data and input parameters. With regard to the equipment of the present illustrative example, there are about 177 items of parameters recordable during the manufacturing process. After eliminating the fixed items set up by the equipment engineers, 96 items of parameters are selected as valid sensor data based on the equipment properties. The parameters can be categorized into six groups including degree of vacuum, inert gas concentration, temperature, voltage, electric current, and power. Then, based on the equipment properties, parameter properties, and opinions from the equipment engineers, 40 out of 96 items of parameters are selected as input parameters, and these 40 items of parameters are mainly related to degree of vacuum, inert gas concentration, and power. The sensor of each module collects and records a record of sensor data every ten seconds, and it takes about one minute to complete the process for one sheet of product, and thus there are six samples of sensor data and one sheet of finished products generated every minute. Referring to FIG. 6, FIG. 6 is a table showing the samples of sensor data and product measurement data according to the illustrative example of the present invention, wherein several samples of sensor data and product measurement values are listed, and the information listed, from left to right, includes sample time, vacuum, gas concentration 1, gas concentration 2, gas concentration 3, power, move-in time, and product measurement data. A pair of sheets of products are randomly chosen from every 100 sheets of products and measured once every 100 minutes. Just as described above, every six samples of sensor data are corresponding to one product's measurement datum, wherein the measurement datum is the reflection wavelength of sputtering coating thickness. The sensors record one set of input parameters every 10 seconds, and thus six sets of parameter data are produced per minute. In the illustrative example, all the six sets of parameter data are fed into the neural-network conjecture model in time sequence.

Thereafter, step 424 is performed to assign possible number of hidden layers, possible numbers of nodes and transfer functions. With regard to the selection of number of hidden layers, generally, adopting one or two hidden layers is sufficient to achieve good convergence. Moreover, with more nodes in the hidden layer, the convergence rate can be accelerated, and smaller error can be achieved, thus accomplishing better conjecture result. Nonetheless, too many nodes may cause over-learning and excessive training time. On the contrary, if too few nodes exist, the network structure may not be sufficient to construct the correlation between inputs and outputs. Consequently, the number of nodes must be properly set so as to obtain the optimal efficiency. With regard to selecting the transfer function in the hidden layer, the basic transfer functional type for the conventional back-propagation neural network is a Log-Sigmoid type shown as follows:

$$f(x) = \frac{1}{1+e^{-x}}$$

An alternative type of the transfer function is Hyper Tangent-Sigmoid type shown as follows:

$$f(x) = \frac{e^x - e^{-x}}{e^x + e^{-x}}$$

The present illustrative example adopts the neural network model with two hidden layers as the conjecture method, and the possible numbers of nodes is between 1 and 50. Furthermore, the possible transfer function is Log-Sigmoid type or Hyper Tangent-Sigmoid type. The best combination of the number of hidden layers, numbers of nodes, and transfer functions is selected by using the self-searching mechanism.

Thereafter, step 426 is performed to select training data sets and test data sets.

Then, data-preprocessing step 428 is performed to normalize raw data. Before entering the network training step, the input raw data is normalized to increase the training efficiency. After finishing the training of neural networks, the output data have to be de-normalized to recover the actual physical scale of the output data.

Thereafter, step 430 is performed to set up conditions for training termination. The present illustrative example chooses training cycle number and error bounds as conditions for training termination. When either training cycle number reaches the limit or the error is within the bounds specified by the users, the training step is terminated.

Then, step 432 is performed to set up initial weights. Commonly, the neural networks usually set up the initial weights randomly, whereas the present illustrative example adopts the conditional-random method proposed by Nguyen and Widrow to create initial weights.

After the setup of initial weights is completed, step 434 is performed to start running the neural networks, thereby obtaining a conjecture value.

Thereafter, step 436 is performed to compute an error value between the conjecture value and an actual measurement datum (value), wherein mean square error (MSE) function is adopted herein as the evaluation criterion as follows:

$$MSE = \frac{1}{n}\sum_{i=1}^{n}(e_i)^2 = \frac{1}{n}\sum_{i=1}^{n}(y_i - \hat{y}_i)^2$$

n: sample number, $e_i$: error value, $y_i$: actual measurement value,
$\hat{y}_i$: conjecture value Thereafter, step 438 is performed to check if the conditions for terminating the training step have been met. When the number of training cycles for the training step reaches a predetermined limit value, or the error value is lower than a predetermined error value, the training step is terminated.

If the conditions for training termination are not met, step 440 is performed to return the error value for tuning initial weights, and then step 434 is performed to run the neural networks again, wherein the step 440 is based on the theory of back-propagation neural networks, and the aforementioned do-loop forms the self-learning mechanism of the back-propagation neural networks.

If the termination conditions of the step 438 are met, step 442 is then performed to check if the self-searching step is finished. If not, step 444 is performed to select a new number of hidden layers, new numbers of nodes and new transfer functions, and then step 432 is performed to step up initial weights again. In the step 444, the self-searching mechanism checks if any combination of the new number of hidden layers, new numbers of nodes and new transfer functions has not been tested. If yes, then the self-searching mechanism will select a combination of new number of hidden layers, new numbers of node and new transfer functions and return to step 432 for continuously testing. If all the combinations of the number of hidden layers, numbers of nodes and transfer functions have been tested, then the self-searching mechanism will jump to step 446 for selecting and storing the optimal combination of the initial weights, thus completely establishing the conjecture model.

In the present illustrative example, the neural-network conjecture model is established by using self-learning and self-searching mechanisms. System developers merely need to first assign a possible number of hidden layers, a possible number of nodes in each hidden layer, possible transfer functions, desired training data set and test data set, and termination conditions, and then the self-learning and self-searching mechanisms will automatically search for the best neural-network conjecture model and all of the initial weights, wherein the time required to search for the best model depends on the termination conditions and the possible number of hidden layers, possible numbers of nodes, and transfer functions. If the search time is expected to be shortened, all it needs to do is reduce the possible numbers of layers and nodes accordingly. Commonly speaking, based on the previous experience, the parameter range may be condensed for the purpose of reducing the search time. However, if the search time is unimportant, then enlarging the possible numbers and reducing the error bounds may produce a more accurate neural-network conjecture model.

Further, in the present illustrative example, moving average is used to construct the prediction modeling means. The moving average adopts the actual measurements ($y_{i-1}$, $y_{i-2}$) of two previous product lots obtained from the measurement tool and a conjecture value ($\hat{y}_i$) of the current product lot from the neural-network conjecture model to predict the product quality (prediction value; $\hat{y}_{i+1}$) of the next product lot. Meanwhile, the present illustrative example builds two prediction models of simple moving average and weighted moving average (WMA) for comparing the prediction results, wherein the self-searching mechanism is also used for searching the initial weights to obtain the best prediction model. Weighted moving average is expressed using the following formula:

$$\hat{y}_{i+1} = w_i \hat{y}_i + w_{i-1} y_{i-1} + w_{i-2} y_{i-2}$$

where $w_i$, $w_{i-1}$, $w_{i-2}$ are assigned weights.

Initially, the user merely need to specify the range of possible combinations of initial weights, and then the self-searching mechanism would calculate all the prediction values ($\hat{y}_{i+1}$) corresponding to all the possible combinations of initial weights exhaustively. Thereafter, the best initial weights are selected by checking that the error between its associated prediction value (expressed as $\hat{y}_{i+1}$) and the actual measurement value (expressed as $y_{i+1}$) is minimal.

Moreover, the present illustrative example employs an evaluation index to determine the prediction accuracy, wherein the evaluation index adopts mean absolute percentage error (MAPE) and max error (MaxError) to evaluate the conjecture/prediction accuracy of the quality prognostics system. The formula is illustrated as follows:

$$MAPE = \frac{100}{n} \sum_{i=1}^{n} \left| \frac{A_i - F_i}{A_i} \right| \%$$

$$MaxError = 100 \cdot Max \left| \frac{A_i - F_i}{A_i} \right| \%$$

i=1, . . . , n, $A_i$: actual value, $F_i$: prediction value, n: sample number

The more closely the MAPE value approaches zero, the better the conjecture/prediction accuracy of the model holds. The max error stands for the maximum difference between the actual measurement value and the prediction value.

Figure 7:
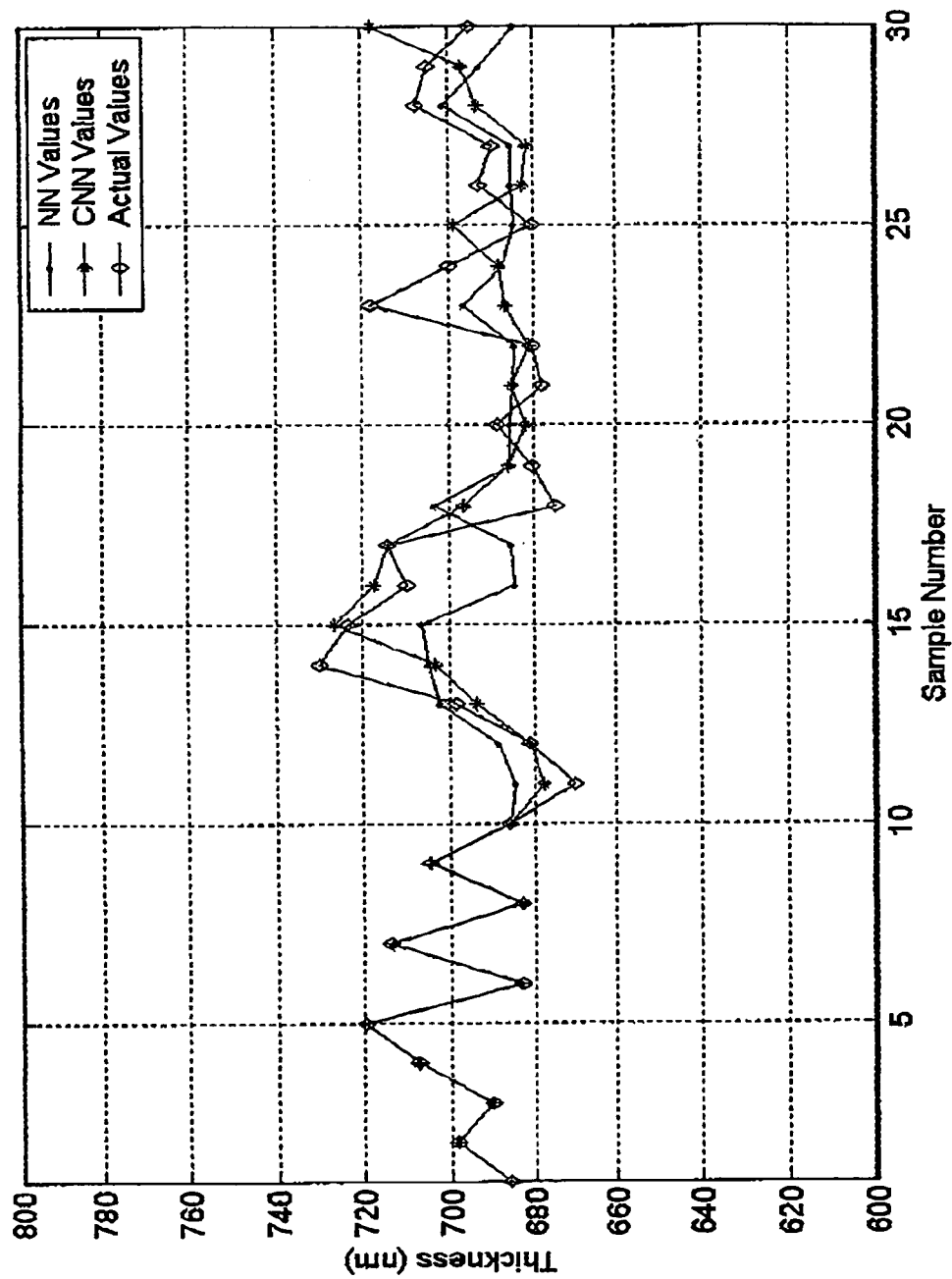
FIG. 7 is a schematic diagram showing the prediction result of the illustrative example of the present invention.

Besides WMA, the prediction model of the present illustrative example also can be built by neural networks, wherein two separate neural network models (NN) can be adopted for the conjecture model and the prediction model, or both of the conjecture model and the prediction model can be combined as one neural network model (CNN; combined neural network). Referring to FIG. 7, FIG. 7 is a schematic diagram showing the prediction result of the illustrative example of the present invention, wherein 1-10 sets of sample data are used for training data; and 11-30 sets of sample data are used for testing data. The test results of the present illustrative example show that the MAPE value of NN case is 1.82% and that of CNN case is 1.75%; the MaxError value of NN case is 4.93% and that of CNN case is 4.25%.

The operation procedure of the self-adjusting means is explained below.

Figure 8:
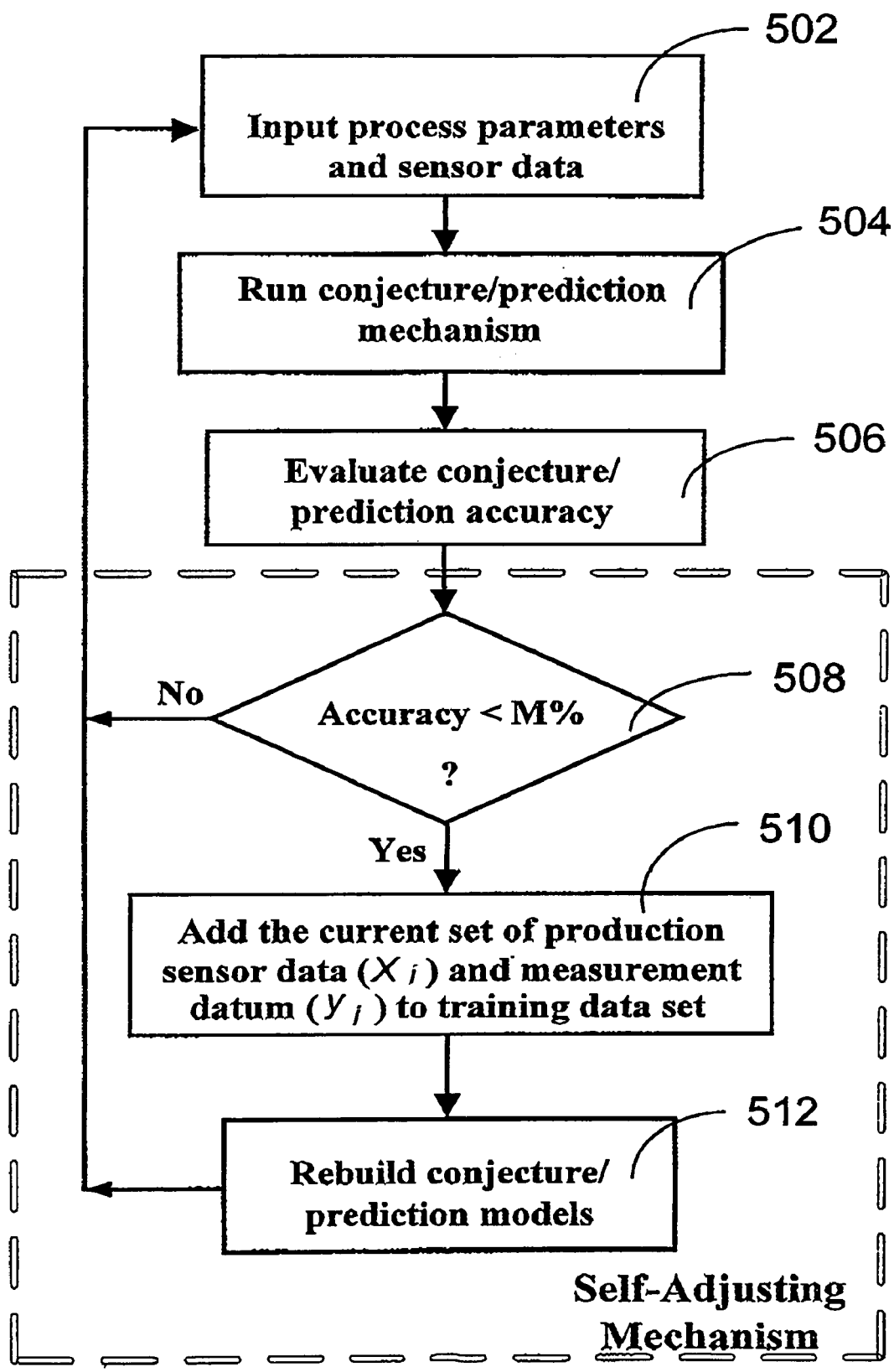
FIG. 8 is a schematic flow chart showing the operation procedure of the self-adjusting means according to the preferred embodiment of the present invention.

Referring to FIG. 8, FIG. 8 is a schematic flow chart showing the operation procedure of the self-adjusting means according to the preferred embodiment of the present invention. After the quality prognostics system shown in FIG. 2 is established, the quality prognostics of product can be started. At first, step 502 is performed to input sensor data and process parameters, wherein the sensor data and process parameters are obtained from the production tool to be prognosed, and are inputted to the quality prognostics system.

Step 504 is performed to run the conjecture/prediction mechanisms (modeling steps). After the quality prognostics system obtains the sensor data and process parameters from the production tool, the conjecture/prediction mechanisms are used to perform the quality prognostics (conjecture/prediction) for the next product lot.

Thereafter, step 504 is performed to evaluate the conjecture/prediction accuracy. The self-adjust mechanism (means) is based on the conjecture/prediction value of the product to evaluate the conjecture prediction accuracy (step 506).

Then, step 508 is performed to determine if the conjecture/prediction accuracy is lower than the predetermined lower bound M % (such as 95%). If yes, the current set of production sensor data ($X_i$) and measurement datum ($y_i$) of which the conjecture/prediction accuracy is lower than the predetermined lower bound, are added to the training data sets (step 510), and then the conjecturing/prediction mechanisms (modeling steps) are re-trained and rebuilt (step 512). Step 512 uses the data selected from step 510 and the aforementioned methods to rebuild the conjecturing/prediction mechanisms (modeling steps). Subsequently, step 502 is performed to run the conjecture/prediction mechanisms for the next product lot.

Figure 9:
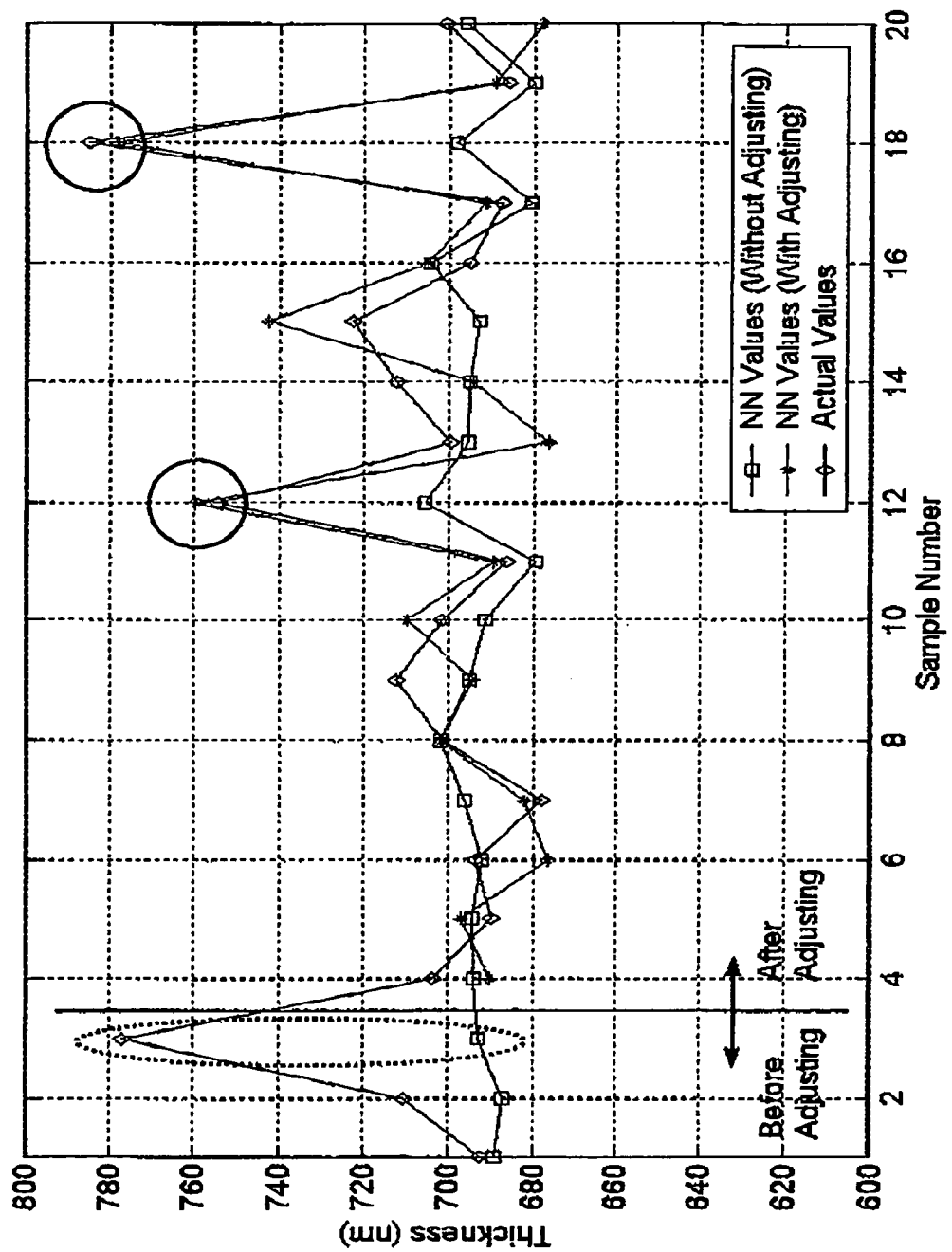
FIG. 9 is a schematic diagram showing the effects of the self-adjusting means on the conjecture modeling means using a neural network model, according to the preferred embodiment of the present invention.

Referring to FIG. 9, FIG. 9 is a schematic diagram showing the effects of the self-adjusting means on the conjecture modeling means using a neural-network model, according to the preferred embodiment of the present invention, wherein square signs stand for the conjecture values with self-adjustment; and asterisk (*) signs stand for the conjecture values without self-adjustment. It can be known from FIG. 9 that the accuracy of the conjecture model with the self-adjusting mechanism is better than that without the self-adjusting mechanism. (The MaxError value of the without-adjusting case is 11.04%, while that of the with-adjusting case is only 3.39%.) For example, when the production tool has the situation of property drift/shift, and the NN or CNN model was not trained to cover have the data related to the drift/shift situation data, the conjecture/prediction accuracy will be degraded due to the drift/shift situation (such as shown in the dotted oval line located on the left side of FIG. 9). At this point, the quality prognostics system will launch the self-adjusting mechanism, and add the aforementioned drift/shift situation data to the training data sets. Afterwards, when the similar drift/shift situation occurs again, the prognostics system will be able to accurately conjecture/predict the drift/shift situations (such as shown in the circle lines located on the middle and right side of FIG. 9). Hence, the design of self-adjusting for the NN or CNN model can promote the accuracy of the quality prognostics mechanism.

Further, a simplified quality prognostics system of the present invention is explained below.

Figure 10:
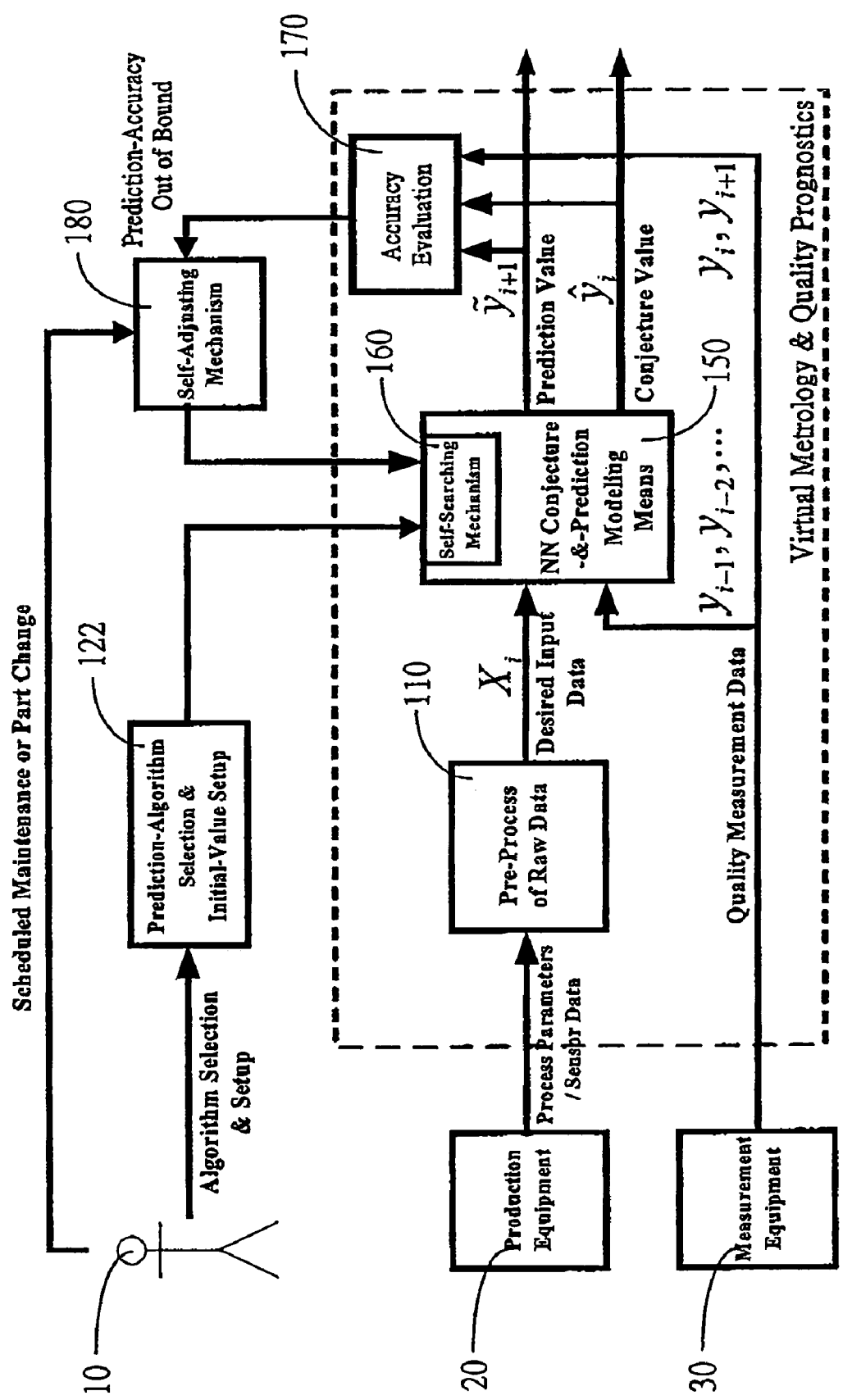
FIG. 10 is a schematic flow chart showing a quality prognostics system for manufacturing processes according to the other preferred embodiment of the present invention, wherein the quality prognostics system is a combined conjecture-prediction modeling means using one combined neural network (CNN) model.

The typical quality prognostics system of the present invention having the conjecture and prediction capability is shown in FIG. 2. However, if the conjecture method (algorithm) and the prediction method (algorithm) both adopt neural network models, then the conjecture and prediction modeling means 100/200 can be combined. Referring to FIG. 10, FIG. 10 is a schematic flow chart showing a quality prognostics system for manufacturing processes according to the other preferred embodiment of the present invention, wherein the quality prognostics system is a combined conjecture-prediction modeling means using one combined neural network (CNN) model. The quality prognostics system is composed of selection-and-setup interface 122, conjecture/prediction means 150, self-searching means 160, and means 170 for accuracy evaluation. The input values of the conjecture/prediction means 150 are the current desired sensor data and process parameters ($X_i$) from the raw-data pre-processing means 110, and the actual measurement values ($y_{i-1}$, $y_{i-2}$, ..., $y_{i-n}$) of several previous product lots; and the output values are a conjecture value ($\hat{y}_i$) of the current product lot, and the prediction value ($\tilde{y}_{i+1}$) for the next product lot.

The MAPE prediction results for the quality prognostics systems constructed from a neural-network (NN) conjecture model and a WMA prediction model; a NN conjecture model and a NN prediction model; and a combined neural network (CNN) model are 1.73%, 1.76% and 1.63% respectively. Also, the difference among their MaxErrors is within 1%. Based on the above results, the feasibility of theses three combinations to the quality prognostics scheme of the illustrative example is justified.

From the aforementioned embodiment of the present invention, it can be known that the quality of a next product lot can be prognosed before being produced by using the current process parameters sensed from a production tool and the actual measurement values of several previous product lots collected from the measurement tool, thereby greatly reducing defective products, thus not only promoting plant throughput but also lowering production cost; and the present invention also has generic applicability, thus promoting competitiveness. Moreover, the present invention can be used for both virtual metrology and quality prediction, and have generic capability. Further, the present invention has the self-searching and self-adjusting mechanisms, thereby effectively increasing the conjecture/prediction accuracy.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A quality prognostics system for manufacturing processes, comprising:
   conjecture modeling means for using a set of current input data of a production tool to conjecture a conjecture value for a product lot currently manufactured in said production tool, wherein said conjecture modeling means is built in accordance with a conjecture method, and said conjecture method is selected from the group consisting of a first neural network technique, a fuzzy logic technique and a stepwise regression technique; and
   prediction modeling means for using said conjecture value of said product lot together with at least two actual measurement values of at least two previous product lots to predict a prediction value for a next product lot, wherein said at least two previous product lots are respectively produced in at least two production cycles, and said at least two actual measurement values are one-to-one corresponding to said at least two previous product lots respectively, and said prediction modeling means is built in accordance with a prediction method, and said prediction method is selected from the group consisting of a weighted moving average technique and a second neural network technique.

2. The quality prognostics system of claim 1, further comprising:
   raw-data pre-processing means for converting a set of raw data inputted from said production tool to a set of desired input data of a specific format.

3. The quality prognostics system of claim 1, further comprising:
   self-searching means for finding an optimal combination of parameters/functions required by said conjecture method or said prediction method when said conjecture method or said prediction method is just selected and related initial values are just set up, thereby increasing the prediction/conjecture accuracy.

4. The quality prognostics system of claim 1, further comprising:
   self-adjusting means for tuning system parameters to meet the prediction/conjecture accuracy requirement of said production tool when a prediction accuracy or a conjecture accuracy is lowered than a predetermined lower bound.

5. The quality prognostics system of claim 1, further comprising:
   a selection-and-setup interface for assisting users to select said conjecture method and said prediction method properly, and setting up related initial values.

6. The quality prognostics system of claim 1, wherein said conjecture modeling means has the function of virtual metrology.

7. The quality prognostics system of claim 1, further comprising:
   an evaluation index used to evaluate the conjecture/prediction accuracy for said manufacturing processes.

8. The quality prognostics system of claim 1, wherein said conjecture modeling means is built in accordance with said first neural network technique, and said prediction modeling means is built in accordance with said second neural network technique which is the same as said first neural network technique, thereby forming said conjecture modeling means and said prediction modeling means as a combined conjecture-prediction modeling means with outputting said conjecture value for said product lot currently manufactured in said production tool, and said prediction value for said next product lot.

9. A quality prognostics method for manufacturing processes, comprising:
   providing a conjecture modeling step for using a set of current input data of a production tool to conjecture a current conjecture value for a product lot currently manufactured in said production tool, wherein said conjecture modeling step is based on a conjecture method, and said conjecture method is selected from the group consisting of a first neural network technique, a fuzzy logic technique and a stepwise regression technique; and
   providing a prediction modeling step for using said current conjecture value of said product lot together with at least two actual measurement values of at least two previous product lots to predict a prediction value for a next product lot, wherein said at least two previous product lots is respectively produced in at least two production cycles, and said at least one actual measurement value is one-to-one corresponding to said at least one previous product lot, and said prediction modeling step is based on a prediction method, and said prediction method is selected from the group consisting of a weighted moving average technique and a second neural network technique.

10. The quality prognostics method of claim 9, further comprising:

performing a raw-data pre-processing step for converting a set of raw data inputted from said production tool to a set of desired input data of a specific format.

11. The quality prognostics method of claim 9, further comprising:

performing a self-searching step for finding an optimal combination of parameters/functions required by said conjecture method or said prediction method when said conjecture method or said prediction method is just selected and related initial values are just set up, thereby increasing the prediction/conjecture accuracy.

12. The quality prognostics method of claim 11, wherein said conjecture method adopts said first neural network technique for building neural networks, said conjecture modeling step further comprising:

collecting sensor data of said production tool, and selecting a plurality of input parameters for said production tool;

assigning a possible number of hidden layers, possible numbers of nodes and possible transfer functions;

selecting a plurality of training data sets and a plurality of test data sets;

normalizing said sensor data and said input parameters before entering a training step of said neural networks, and de-normalizing an output value derived from said first neural network technique after said training step is done;

setting up conditions for terminating said training step;

setting up initial weights for said neural networks;

running said neural networks for obtaining a conjecture output value;

computing an error value between said conjecture output value and said actual measurement datum;

checking if said conditions for terminating said training step have been met, wherein said conditions includes that the number of training cycles for said training step reaches a predetermined limit value, and that said error value is lower than a predetermined error value; and said training step of said neural networks is terminated when either one of said conditions has been met;

when said conditions have not been met, returning said error value to said step of setting up said initial weights for re-tuning, and then running said neural networks;

checking if said self-searching step is finished and generating a checking result;

when said checking result is no, selecting a new possible number of hidden layers, new possible numbers of nodes and new possible transfer functions; and when said checking result is yes, said initial weights, said possible number of hidden layers, said possible numbers of nodes and said possible transfer functions are selected as an optimal combination, and completing the establishment of said conjecture modeling.

13. The quality prognostics method of claim 9, wherein said conjecture modeling step can be used for performing virtual metrology.

14. The quality prognostics method of claim 9, further comprising:

providing an evaluation index used to evaluate the conjecture/prediction accuracy for said manufacturing processes.

15. The quality prognostics method of claim 9, wherein said prediction method adopts said weighted moving average method, said weighted moving average technique using said actual measurement values ($y_{i-1}$, $y_{i-2}$) of two previous product lots obtained from a measurement tool together with said current conjecture value ($\hat{y}_i$) to predict said prediction value ($\tilde{y}_{i+1}$) of said next product lot, wherein the formula of said weighted moving average method is $\tilde{y}_{i+1} = w_i \hat{y}_i + w_{i-} y_{i-1} + w_{i-2} y_{i-2}$ wherein $w_i$, $w_{i-}$, $w_{i-2}$ are assigned weights.

16. The quality prognostics method of claim 9, further comprising:

performing a self-adjusting step for tuning system parameters to meet the prediction/conjecture accuracy requirement when a prediction accuracy or a conjecture accuracy is lowered than a predetermined accuracy bound.

17. The quality prognostics method of claim 16, wherein said self-adjusting step comprises:

inputting sensor data and a plurality of process parameters from said production tool;

performing said conjecture modeling step or said prediction modeling step for obtaining said current conjecture value or said prediction value for said next product lot;

evaluating said conjecture accuracy or said prediction accuracy for said current conjecture value or said prediction value;

determining if said conjecture accuracy or said prediction accuracy is lower than said predetermined lower bound, and generating a determination result; and when said determination result is yes, adding the current set of production sensor data and measurement datum of which said conjecture accuracy or said prediction accuracy is lower than said predetermined lower bound to said training data sets, and re-training and rebuilding said conjecturing modeling step or said prediction modeling step, and then subsequently performing said conjecture modeling step or said prediction modeling step for said next product lot.

18. The quality prognostics method of claim 17, wherein when said determination result is no, performing said conjecture modeling step or said prediction modeling step for a new next product lot following said next product lot.

19. The quality prognostics method of claim 9, wherein said conjecture modeling step is based on said first neural network technique, and said prediction modeling step is based on said second neural network technique which is the same as said first neural network technique, thereby forming said conjecture modeling step and said prediction modeling step as a combined conjecture-prediction modeling step with outputting said conjecture value for said product lot currently manufactured in said production tool, and said prediction value for said next product lot.

* * * * *